(12) United States Patent
Lessing

(10) Patent No.: US 9,489,109 B2
(45) Date of Patent: Nov. 8, 2016

(54) DATA COMMUNICATION IN AN ELECTRONIC DEVICE

(75) Inventor: Simon Lessing, Barsebäck (SE)

(73) Assignee: Sony Ericsson Mobile Communication AB, Lund (SE)

( * ) Notice: Subject to any disclaimer, the term of this patent is extended or adjusted under 35 U.S.C. 154(b) by 1812 days.

(21) Appl. No.: 11/277,951

(22) Filed: Mar. 30, 2006

(65) Prior Publication Data

US 2007/0239981 A1    Oct. 11, 2007

(51) Int. Cl.
| | | |
|---|---|---|
| H04B 5/00 | (2006.01) |
| G06F 3/0484 | (2013.01) |
| G06K 7/10 | (2006.01) |
| H04M 1/725 | (2006.01) |
| H04N 1/00 | (2006.01) |
| H04N 1/32 | (2006.01) |
| H04N 1/327 | (2006.01) |
| G06F 3/0488 | (2013.01) |

(52) U.S. Cl.
CPC ......... *G06F 3/04842* (2013.01); *G06F 3/0488* (2013.01); *G06K 7/10237* (2013.01); *H04B 5/0031* (2013.01); *H04M 1/7253* (2013.01); *H04N 1/0035* (2013.01); *H04N 1/00307* (2013.01); *H04N 1/00342* (2013.01); *H04N 1/00411* (2013.01); *H04N 1/32138* (2013.01); *H04N 1/32765* (2013.01); *H04N 1/32767* (2013.01); *H04M 2250/04* (2013.01); *H04M 2250/22* (2013.01); *H04M 2250/64* (2013.01); *H04N 2201/0036* (2013.01); *H04N 2201/0055* (2013.01)

(58) Field of Classification Search
CPC .................................. G06F 3/04842
USPC ....................... 455/41.1, 41.2, 41.3; 713/164
See application file for complete search history.

(56) References Cited

U.S. PATENT DOCUMENTS

| | | | |
|---|---|---|---|
| 4,837,802 A * | 6/1989 | Higashiyama et al. ....... 455/463 |
| 7,427,926 B2 * | 9/2008 | Sinclair et al. ................ 340/4.2 |
| 2002/0051629 A1 | 5/2002 | Endo |
| 2004/0070681 A1 | 4/2004 | Battles et al. |
| 2006/0052055 A1 * | 3/2006 | Rowse et al. ................ 455/41.1 |
| 2006/0063539 A1 * | 3/2006 | Beyer, Jr. ................... 455/456.3 |
| 2006/0186995 A1 * | 8/2006 | Wu et al. ..................... 340/10.1 |

FOREIGN PATENT DOCUMENTS

| | | |
|---|---|---|
| JP | 2005-045557 | 2/2005 |
| JP | 2005-051682 | 2/2005 |
| JP | 2005-159958 | 6/2005 |

\* cited by examiner

*Primary Examiner* — Hsin-Chun Liao
(74) *Attorney, Agent, or Firm* — Renner, Otto, Boisselle and Sklar LLP

(57) ABSTRACT

The invention relates to an electronic device (10) and a method for data communication with such an electronic device. The electronic device combines, on the one hand, a Near Field Communication (NFC) interface, including an antenna and a circuit for generating a modulated electromagnetic wave, and on the other hand a user interface including a touch-sensitive display configured to present an object relating to a communication action executable by means of the NFC interface. A control unit connected to the NFC interface and the user interface, is configured to trigger the NFC interface to execute the communication action responsive to simultaneous detection of the presented object being touched and the NFC interface being in communicative connection with a second NFC interface of a second device.

28 Claims, 2 Drawing Sheets

DATA COMMUNICATION IN AN ELECTRONIC DEVICE

FIELD OF THE INVENTION

The present invention relates to electronic devices, and means for data communication using electronic devices. More particularly, the invention relates to a user friendly solution for communicating data using an electronic device with a Near Field Communication interface.

BACKGROUND

Digital mobile telephony has become one of the most important ways of communicating, both for making voice calls and exchanging data. For the mere purpose of exchanging data, network protocols have also evolved for use by means of computers, e.g. in Wireless Local Area Networks (WLAN).

A system for short range radio communication between electronic devices has also been provided under the name Bluetooth™. Bluetooth is basically a wireless personal area network technology, which is an open standard for short-range transmission of digital voice and data between predominantly mobile devices, and supports point-to-point and multipoint applications. Bluetooth typically provides up to 720 Kbps data transfer within a range of 10 meters and up to 100 meters with a power boost. Bluetooth uses omni-directional radio waves that can transmit through walls and other non-metal barriers in the unlicensed 2.4 GHz band.

In recent years, a new technology for even shorter range communication in the mobile telecommunications market has evolved, based on radio frequency identification (RFID) and generally referred to as Near Field Communication (NFC). NFC has been characterized as the intuitive link between consumer devices, and facilitates short-range communication between electronic devices, such as mobile phones, Personal Digital Assistants (PDA), computers and advanced consumer electronics, via a fast and easy wireless connection. The NFC technology has been developed jointly by Royal Philips Electronics and Sony Corporation, and enables consumers to securely exchange and store all kinds of information including ownership rights, credit card numbers, coupons, membership messages, pictures and MP3 files, simply by bringing two devices close together. NFC may act as a secure smart key for access to content and services such as cashless payment, ticketing, online entertainment and access control, and can also be used to automatically configure and initiate wireless connections under other protocols, such as Bluetooth or Wi-Fi, enabling devices to communicate at longer ranges or transfer data at higher rates.

Typically, NFC provides a contactless proximity interaction over a few centimeters which simplifies the issue of identification, as there is less confusion when devices can only connect with their immediate neighbors. A number of NFC trials are currently taking place around the globe. Since December 2005, a major NFC trial has been underway at the Philips Arena stadium in Atlanta, Ga., allowing sports fans to easily buy goods at concession stands and apparel stores. Additionally they are able to access and download mobile content such as ring tones, wallpapers, screensavers and clips from favorite players and artists by holding their NFC-enabled phone in front of a poster embedded with an NFC tag.

NFC runs on the 13.56 MHz frequency band with a read and write range of up to 10 centimeters. It operates at data rates of 106 kbits/s and 212 kbits/s, although higher transmission speeds can be achieved between dedicated NFC devices, initially up to 424 kbits/s with potential for higher bit rates. As NFC devices can operate in an active or passive mode, the technology also offers a unique link to the contactless smart card world as it is compatible with the broadly established contactless smart card infrastructure based on ISO 14443 A (i.e. Philips MIFARE® technology), as well as Sony's FeliCa™ card used for electronic ticketing in public transport and for payment applications. It also allows mobile devices to communicate in passive mode, saving power and extending battery life. Targeted to become a widely adapted contactless infrastructure, NFC is already standardized according to globally accepted standardization bodies, such as ISO (18092), ECMA (340) and ETSI. As is often the case with the devices sharing a single RF band, the communication is half-duplex. The devices implement the "listen before talk" policy—any device must first listen on the carrier and start transmitting a signal only if no other device can be detected transmitting. Furthermore, the NFC protocol distinguishes between the Initiator and the Target of the communication. Any device may be either an Initiator or a Target. The Initiator, as follows from the name, is the device that initiates and controls the exchange of data. The Target is the device that answers the request from the Initiator. The NFC protocol also distinguishes between two modes of operation: Active mode and Passive mode. All devices support both communication modes. The distinction is as follows:

In the Active mode of communication both devices generate their own RF field to carry the data.

In the Passive mode of communication only one device generates the RF field while the other device uses load modulation to transfer the data. The protocol specifies that the Initiator is the device responsible to generate the RF field.

SUMMARY OF THE INVENTION

Many electronic devices of today are capable of exchanging data with other devices in several different ways. A mobile phone, for instance, is typically configured to communicates with a radio communications network such as a WCDMA network, for voice calls and for downloading or streaming data from content servers. A Bluetooth chip is often also included, enabling short range communication. NFC technology provides yet another means for communication using the same electronic device. Even though the different communication technologies are intended to supplement each other, it may be difficult for the average user with limited technical skills to appropriately handle an electronic device.

It is therefore an object of the invention to provide a simple and intuitive solution for communicating data to or from an electronic devices. According to a first aspect of the invention, the stated object is fulfilled by means of an electronic device, comprising:

a Near Field Communication (NFC) interface, including an antenna and a circuit for modulating an electromagnetic wave;

a user interface including a touch-sensitive display configured to present an object relating to a communication action executable by means of the NFC interface; and a control unit connected to the NFC interface and the user interface, configured to trigger the NFC interface to execute the communication action responsive to simultaneous detection of the presented object being touched and the NFC interface being in communicative connection with a second NFC interface of a second device.

In one embodiment, the user interface is configured to present a plurality of separate objects, where each of the objects are separately touchable on the display to execute the related communication action by means of the NFC interface.

In one embodiment, the objects represent different commands.

In one embodiment, the objects represent different data items.

In one embodiment, the same communication action is tied to each object, and wherein the control unit is configured to execute the communication action on the data item to which a touched object relates.

In one embodiment, the user interface comprises an indicator configured to provide a visual signal responsive to the NFC interface being in communicative connection with a second NFC interface of a second device.

In one embodiment, the user interface comprises an input key, activation of which triggers the user interface to present the plurality of separate objects on the display.

In one embodiment, the control unit is configured to trigger the user interface to present the plurality of separate objects on the display responsive to the NFC interface establishing a communication connection with a second NFC interface.

In one embodiment, each one of the objects relate to a data item, wherein the control unit is configured to execute sending of a data item to the second electronic device responsive to sensing touching of the related object.

In one embodiment, the user interface is configured to present a plurality of pictures or icons, where each of the pictures or icons are separately touchable on the display to execute sending of data related to the picture or icon by means of the NFC interface.

In one embodiment, the user interface is configured to present a plurality of command options, where each command option relates to sending of different types of data, wherein each of the command option are separately touchable on the display to execute sending of data related to the command option by means of the NFC interface.

In one embodiment, the device is a mobile telephone.

In one embodiment, the second device is a mobile telephone.

In one embodiment, the second device is an NFC tag.

In one embodiment, the NFC interface comprises:
a modulator for sending data by modulating electromagnetic waves.

In one embodiment, the NFC interface comprises:
an electromagnetic wave generator for forming a radio frequency field, connected to the antenna;
a demodulator connected to the antenna for acquiring data modulated in an electromagnetic wave.

In one embodiment, the antenna comprises a closed loop coil.

In one embodiment, the NFC interface is configured to operate in the 13.56 MHz frequency band.

According to a second aspect of the invention, the stated object is fulfilled by means of a method for data communication in an electronic device, comprising the steps of:
providing an electronic device including a Near Field Communication (NFC) interface with an antenna connected to a circuit for modulating an electromagnetic wave, and a user interface comprising a touch-sensitive display;

positioning the NFC interface within communication range of a second NFC interface of a second device;
presenting an object, relating to a communication action executable by means of the NFC interface, on the display;
sensing touching of the presented object; and
executing the communication action responsive to simultaneously detecting touching of the presented object and a present communicative connection between the NFC interface and the second NFC interface.

In one embodiment, the method comprises the steps of:
presenting a plurality of separate objects, where each of the objects are separately touchable on the display to execute the related communication action by means of the NFC interface.

In one embodiment, the objects represent different commands.

In one embodiment, the objects represent different data items.

In one embodiment, wherein the same communication action is tied to each object, the method comprises the steps of:
executing the communication action on the data item to which a touched object relates.

In one embodiment, the method comprises the step of:
visually indicating that the NFC interface is in communicative connection with the second NFC interface.

In one embodiment, the method comprises the step of:
presenting the plurality of separate objects on the display responsive to sensing activation of an input key.

In one embodiment, the method comprises the step of:
presenting the plurality of separate objects on the display responsive to the NFC interface establishing a communication connection with the second NFC interface.

In one embodiment, wherein each one of the objects relate to a data item, the method comprises the step of:
sending a data item to the second electronic device responsive to sensing touching of the related object.

In one embodiment, the method comprises the steps of:
presenting a plurality of command options, where each command option relates to sending of different types of data;
sending data related to the command option by means of the NFC interface, responsive to detecting touching of the related command option.

In one embodiment, the device is a mobile telephone.

In one embodiment, the second device is a mobile telephone.

In one embodiment, the second device is an NFC tag.

In one embodiment, the NFC interface operates in the 13.56 MHz frequency band.

In one embodiment, the NFC tag comprises a microchip connected to a tag antenna.

The subject matter of the aforementioned embodiments may also be combined.

BRIEF DESCRIPTION OF THE DRAWINGS

The features and advantages of the present invention will be more apparent from the following description of preferred embodiments with reference to the accompanying drawings, on which FIG. 1 schematically illustrates an electronic device with NFC capabilities positioned within communicative range of a second NFC device, where different objects of a common data type which may be sent by NFC are presented on a touch-sensitive display.

DETAILED DESCRIPTION OF PREFERRED EMBODIMENTS

The present invention relates to communication of data in electronic devices, including sending and acquiring data. The electronic device as such may take the shape of e.g. a personal computer, a digital camera, a media player, or a PDA. However, as a best mode of the invention presently known, the invention will mainly be described herein as incorporated in the field of telecommunications, and the electronic device will therefore occasionally be referred to as a mobile phone. It should be noted, though, that the borders between what can be considered a mobile phone, a portable laptop computer, a PDA, becomes less and less clear since many electronic devices include corresponding functions, even though focus is on different functionalities in the different categories of electronic devices. Furthermore, it should be emphasized that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawings.

Figure 1:
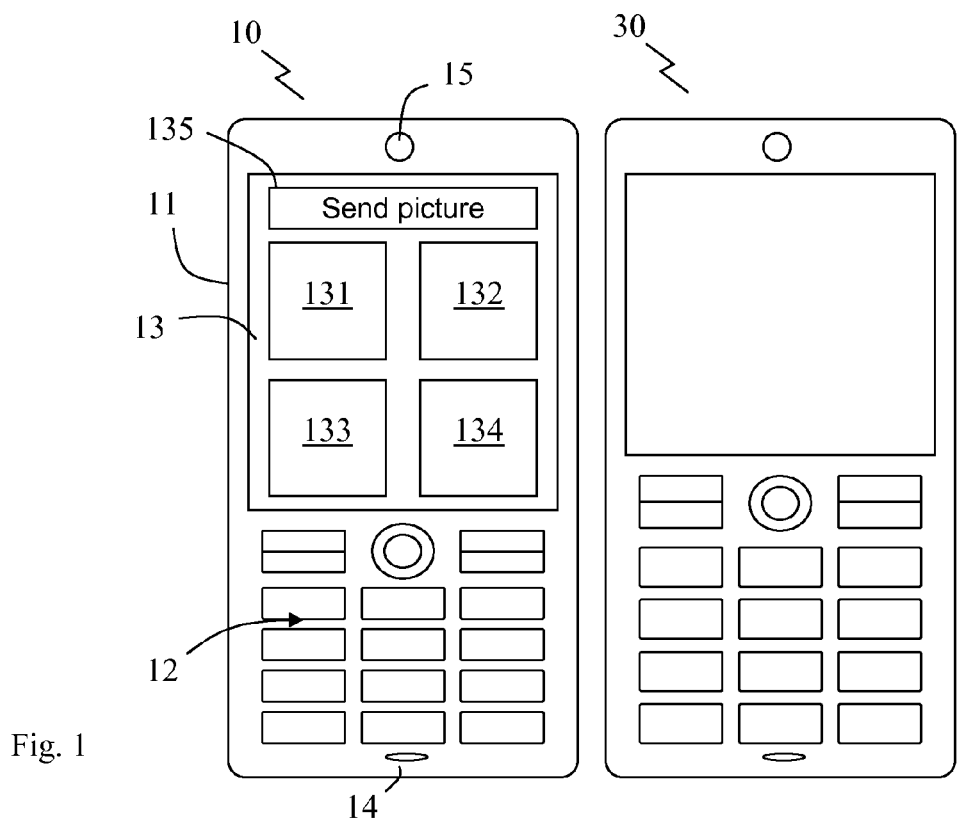

FIG. 1 schematically illustrates a pair of electronic devices 10, 30 in the form of mobile phones, the one to the left being electronic device 10. Details of the mobile phone 10 as such are of little importance to the invention, but for the sake of clarity it should be mentioned that phone 10 comprises a support structure 11 including a chassis and a cover, directly or indirectly supporting the other components of the terminal. Phone 10 is further devised with a user interface comprising a keypad 12 and a touch-sensitive display 13, as well as a microphone 14 and a speaker 15. Though not shown in FIG. 1, phone 10 further comprises a signal transceiver, including an antenna and radio transmission and reception electronics, for communicative connection to a base station of a communications network, such as a WCDMA network. A power supply is preferably included in phone 10 in the form of a battery, and a cable socket for connection to a mains outlet via a transformer. Phone 10 is also devised with a computer system, including a microprocessor with associated memory and software, configured to carry out the tasks of signal processing and data handling in the phone. All of these features are, as such, well known in the field of telecommunication devices.

Figure 3:
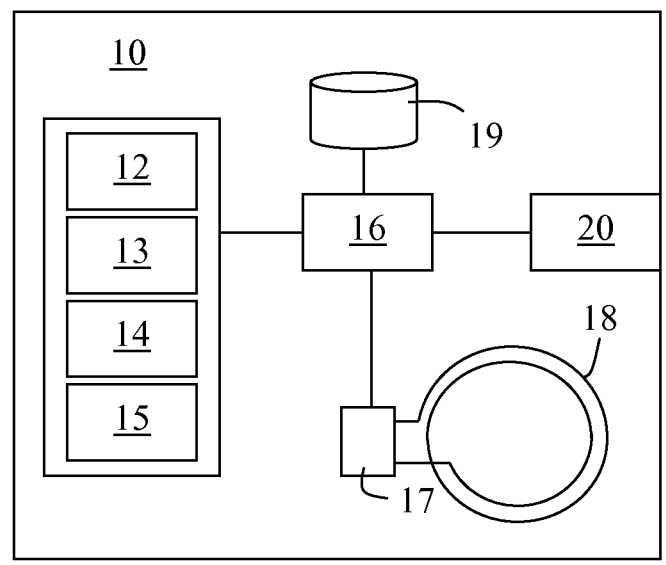
FIG. 3 schematically illustrates an electronic device by means of a block diagram, showing functional elements of an embodiment of the invention.

FIG. 3 is a block diagram, schematically representing mobile phone 10 of FIG. 1. A control unit 16 represents the microprocessor of the computer system configured to control the processes carried out within mobile phone 10. In order for a user to control and monitor the processes carried out under control of control unit 16, the user interface, including keypad 12, display 13, microphone 14 and speaker 15, is communicatively connected to control unit 16. A data memory 19 is also connected to control unit 16, for storing data code in files representing e.g. images, games, music, video and so on. In the present embodiment, where the electronic device is a mobile phone, control unit 16 is also connected to a signal transceiver 20, e.g. including an antenna for wireless communication with a base station in a radio network.

In accordance with the invention, the electronic device here provided in the shape of mobile phone 10 further comprises a contact-free near field communication interface, using electromagnetic waves. The embodiments described herein make use of the Near Field Communication (NFC) technology referred to above. The NFC technology is as such standardized and described in the related literature, and will therefore not be described in detail herein, as it lies within the field of knowledge of the skilled person. However, it may be mentioned that the published European patent application EP 1 431 904 A2 describes both the function and structure of an NFC apparatus, including how an NFC apparatus is configured to communicate data with another NFC apparatus, which may be an NFC tag, by transmitting an electromagnetic wave signal using an antenna, and by detecting a modulated electromagnetic wave signal received in response from the NFC tag. For this reason, EP 1 431 904 A2 is incorporated herein by reference.

Figure 2:
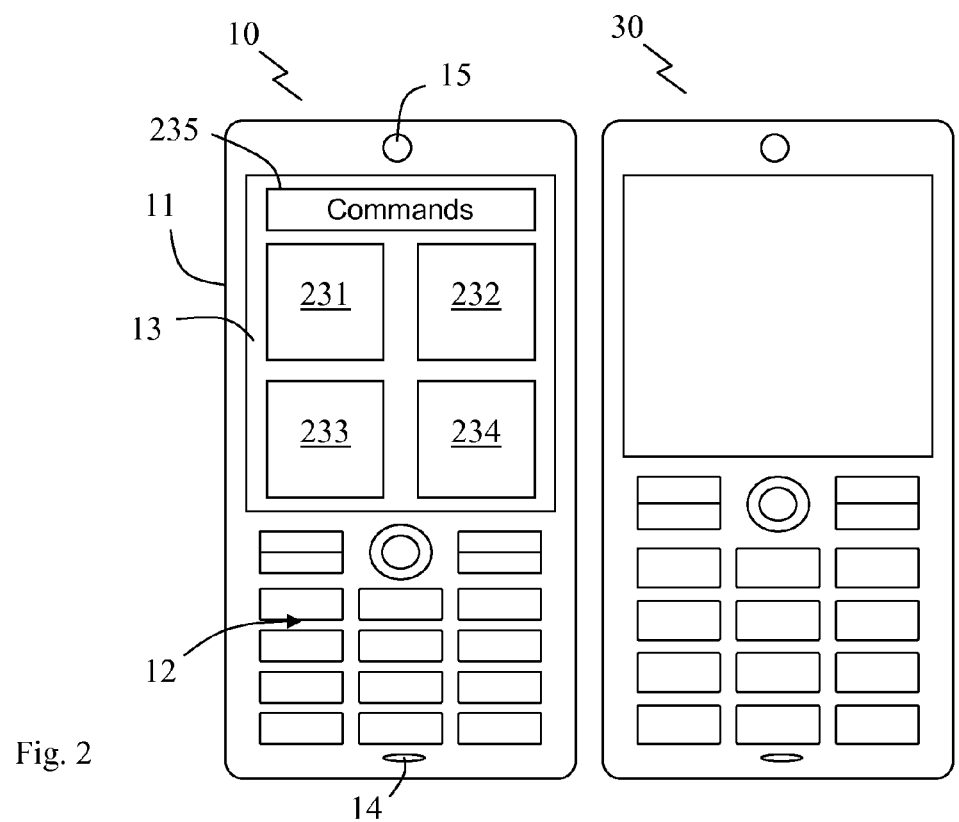
FIG. 2 schematically illustrates an electronic device with NFC capabilities positioned within communicative range of a second NFC device, where different objects representing different commands executable by means of NFC are presented on a touch-sensitive display.

In order to carry out near field communication, the NFC interface of phone 10 therefore comprises an antenna 18 devised for transmission and reception of electromagnetic waves, connected to a circuit 17. Circuit 17 comprises an electromagnetic wave generator for forming a radio frequency field, connected to the antenna, and a modulator connected to the antenna 18, for sending data by modulating electromagnetic waves. The circuit 17 may also comprise a demodulator connected to the antenna for acquiring data modulated in an electromagnetic wave. The specific structure and function of the NFC interface circuitry is not crucial to the present invention, but the NFC interface may e.g. be configured in accordance with the previously mentioned RFID, MIFARE or FeliCa technologies. Antenna 18 is preferably a closed loop coil, as illustrated. The NFC interface is usable for interacting with external NFC devices placed in proximity to antenna 18, such as below phone 10 or beside phone 10 as shown in FIGS. 1 and 2.

The invention relates to combined use of the user interface and the communication interface of an electronic device, here embodied as mobile phone 10. As previously noted, modern day mobile phones are often equipped to provide communication capabilities for interaction in many different communication systems, including long range radio communication in a radio network, such as a WCDMA or GSM network, Bluetooth for direct short range communication with other devices, possibly WLAN communication, as well as being devised for near field communication. The different communication protocols are suitable for different purposes, and new means for communication are continuously developed. NFC has a benefit in its short range, typically 0-20 cm, in that it is generally clear which two devices are arranged to communicate. NFC is a powerful technology for natural interaction by gestures. However, it is not always obvious to a user what will happen when touching or approaching an NFC tag or another electronic device equipped with an NFC interface. For one thing, there are many different actions that can be performed on a certain object. For instance, when a picture is shown on display 13, does positioning of the phones NFC interface adjacent to another devices NFC interface mean Send or Move or Show Temporarily or Hand Over Slideshow Control, etc? As another example, there may be several different objects shown on display 13, e.g. a plurality of pictures. Even if the action to carry out, such as Send, has been made clear by means of an input command, it is still not obvious which picture should be sent.

In accordance with the invention, this general problem is solved by combining the detection of a present NFC connection with another NFC device, with simultaneous detection of a command entered on the touch-sensitive display 13, as a trigger to execute an NFC communication action.

FIG. 1 illustrates a scenario according to an embodiment of the invention, where phone 10 is placed in contact with or adjacent to a second NFC device 30. In the drawings, second NFC device 30 is also illustrated as a mobile phone, but it should be noted that second device 30 may be any kind of electronic device containing an NFC interface, and even a simple NFC tag. Second electronic device 30 will therefore not be described in any greater detail. The embodiment of FIG. 1 relates to a sharing scenario where the user of phone 10 wants to send a picture to second device 30. A plurality of objects 131-134, in this case pictures, are shown on display 13. In the illustrated embodiment there are four pictures shown but there may of course be more or less than that. The displaying of these pictures may be activated responsive to the NFC interface 17, 18 detecting the presence of second device 30, wherein displaying of images stored in a memory 19 is set as a default action to be carried out when a second NFC device is detected. Alternatively, a command has been entered by the user of phone 10, by means of an input key of keypad 12 or on touch-sensitive display 13, to display all pictures of memory 19, or all pictures of a certain folder in memory 19. In a state of the art mobile phone, there are a number of different actions that may be carried out when one or more pictures are shown on display 13. Using a soft key function, you may e.g. edit the picture, rename it, use it as background, send it and so on. In the present embodiment, though, the simultaneous presentation of the pictures and detection of an established communication link to second device 30, renders a predetermined executable action to be ready to be carried out, and preferably also presentation of a label 135 on display 13 indicating the action, namely Send Picture. By touching e.g. object 131, the first picture, on display 13 while an established communication link to second device 30 is detected, the NFC interface is triggered to execute the command on that object, i.e. to send picture 131. In a state of the art solution for handling pictures in a mobile phone, an input send command is followed by the user being presented a menu with different selectable communication means, such as email, MMS, Bluetooth, IR, and so on. In accordance with the presented embodiment of the invention, this step is no longer necessary in the presence of a second NFC device 30, as NFC will automatically be selected. Furthermore, NFC has been proposed to operate with focus on performing automatic communication tasks when an NFC device is placed in communication range with a second NFC device, for sending or downloading of data. This may not be appropriate when there are many data items, such as pictures, that may be shared, and the user only wants to share one or a few of those objects. As opposed to these prior art procedures, simultaneous touching of the intended object 131 and detection of a communicative connection acts as a confirmation process that data representing that object is to be sent using NFC to the currently connected second device 30. The preferred embodiment of this invention involves the presentation of a plurality of objects which are separately selectable by touching, as shown in FIG. 1, but the invention also works with only one presented object. The embodiment of FIG. 1 has been described for pictures, but may of course as work just as well for other types of data items, such as games, ring tones, video clips and so on, which are then preferably represented by objects in the form of icons or labels.

FIG. 2 illustrates a second embodiment, in which display 13 is filled with a plurality of different objects 231-234 representing different commands. Again, it may be a default setting that this screen is to be presented when a second NFC device 30 is detected to be in communicative connection with phone 10. Alternatively, this screen may be selected by means of a separate command entered by a user of phone 10 using an input key. The different objects preferably represent some of the most commonly used commands for use in near field communications. As an example, object 231 may represent music, and include a label stating "Share Favorite Music". Simultaneous touching of object 231 and detection of a present communicative connection between the NFC interface of phone 10 with a second NFC device 30 will then trigger sending of a music file or playlist stored in memory 19 to the currently connected second device 30 using NFC. A second object 232 may represent a business card, and include a label stating "Send Business Card". Simultaneous touching of object 232 and detection of a present communicative connection between the NFC interface of phone 10 with a second NFC device 30 will then trigger sending of an electronic business card for the user of phone 10 to the currently connected second device 30 using NFC. Other possible objects presentable in a common screen may represent commands such as share a contact, a picture, or a ring signal etc, touching of which may lead to a list where a certain item within the category in question may be selected by touching or by using a navigation tool, which contact is then sent to the second device 30 using NFC. In another embodiment, though, the commands represented in the presented objects are all specific, meaning that one touch of a command uniquely identifies and triggers the action to be executed without having to make a new selection. A label 235 may also be presented, in this case Command, on display 13.

In order to indicate that there is an established communication connection between phone 10 and second device 30, a visual indicator may be employed, functioning to provide a visual indication of an ongoing connection. Such a visual indication may be given by a separate photo diode on phone 10 (not shown), or by an indication on display 13.

By combining a touch-sensitive display function with detection of NFC communication connection, the ease of use of NFC communication is enhanced. Making e.g. a plurality of selectable commands visible on the display decreases the invisibility of NFC interaction, so that the user will sure of what actually happens in the interaction with another NFC device. Furthermore, there will be fewer accidental interactions when the phone is positioned in communication range with other NFC devices, since the user needs to touch an object on the screen to trigger a communication action. This increases the control over the near field communication process. Furthermore, the present invention provides the ease of use sought for by the market, in a time where different types of data communication not only provides extended capabilities but also requires a higher degree of knowledge from the users.

The principles of the present invention have been described in the foregoing by examples of embodiments or modes of operations. However, the invention is not limited to the particular embodiments discussed above, which should be regarded as illustrative rather than restrictive, and it should be appreciated that variations may be made in those embodiments by persons skilled in the art, without departing from the scope of the present invention as defined by the appended claims.

I claim:

1. An electronic device, comprising:
    a Near Field Communication (NFC) interface, including an antenna and a circuit for generating a modulated electromagnetic wave;
    a user interface including a touch-sensitive display configured to present an object relating to a predetermined communication action executable by the NFC interface; and
    a control unit connected to the NFC interface and the user interface, the control unit is configured to detect, as a user confirmation to undertake the predetermined communication action, simultaneous touching of the presented object on the touch-sensitive display and the NFC interface being in communicative connection with a second NFC interface of a second device, and the control unit is configured to trigger the NFC interface to execute the predetermined communication action when the detection of the simultaneous touching and communicative connection is made,
    wherein the user interface is configured to present a plurality of separate objects, where each of the objects are separately touchable on the display to execute the related communication action by the NFC interface,
    wherein the user interface is configured to provide a visual signal indicating that the NFC interface is in communicative connection with a second NFC interface of a second device, and
    wherein the plurality of separate objects presented by the user interface comprise a plurality of selectable commands visually identifying;
        a particular device with which the selectable command is associated; and
        an object transferred to the particular device upon execution, wherein the NFC interface is in communicative connection with the particular device.

2. The electronic device of claim 1, where the objects represent different commands.

3. The electronic device of claim 1, where the objects represent different data items stored by a memory of the electronic device.

4. The electronic device of claim 3, wherein the same communication action is tied to each object, and wherein the control unit is configured to execute the communication action on the data item to which a touched object relates.

5. The electronic device of claim 1, wherein the user interface comprises an input key, activation of which triggers the user interface to present the plurality of separate objects on the display.

6. The electronic device of claim 1, wherein the control unit is configured to trigger the user interface to present the plurality of separate objects on the display as a default action responsive to the NFC interface establishing a communication connection with a second NFC interface.

7. The electronic device of claim 1, wherein each one of the objects relate to a data item stored in a memory of the electronic device, wherein the control unit is configured to execute sending of the data item corresponding to the touched object to the second electronic device as the predetermined communication action.

8. The electronic device of claim 1, wherein the user interface is configured to present a plurality of pictures or icons, where each of the pictures or icons are separately touchable on the display to execute sending of data related to the picture or icon by means of the NFC interface.

9. The electronic device of claim 1, wherein the user interface is configured to present a plurality of command options, where each command option relates to sending of different types of data, wherein each of the command option are separately touchable on the display to execute sending of data related to the command option by means of the NFC interface.

10. The electronic device of claim 1, wherein the device is a mobile telephone.

11. The electronic device of claim 1, wherein the second device is a mobile telephone.

12. The electronic device of claim 1, where the second device is an NFC tag.

13. The electronic device of claim 1, wherein the NFC interface comprises:
    an electromagnetic wave generator for forming a radio frequency field, connected to the antenna;
    a demodulator connected to the antenna for acquiring data modulated in an electromagnetic wave.

14. The electronic device of claim 1, wherein the antenna comprises a closed loop coil.

15. The electronic device of claim 1, wherein the NFC interface is configured to operate in the 13.56 MHz frequency band.

16. A method for data communication in an electronic device, comprising the steps of:
    providing an electronic device including a Near Field Communication (NFC) interface with an antenna connected to a circuit for modulating an electromagnetic wave, and a user interface comprising a touch-sensitive display;
    positioning the NFC interface within communication range of a second NFC interface of a second device;
    presenting an object, relating to a predetermined communication action executable by means of the NFC interface, on the display;
    sensing as a user confirmation to undertake the predetermined communication action, simultaneous touching on the touch-sensitive display of the presented object and the NFC interface being in communicative connection with a second NFC interface of a second device;
    provide via the user interface a visual signal indicating that the NFC interface is in communicative connection with the second NFC interface of the second device;
    executing the predetermined communication when the detection of the simultaneous touching and communicative connection is made; and
    presenting a plurality of separate objects, where each of the objects are separately touchable on the display to execute the related communication action by means of the NFC interface,
    wherein the presented plurality of separate objects comprise a plurality of selectable commands visually identifying;
        a particular device with which the selectable command is associated; and
        an object transferred to the particular device upon execution, wherein the NFC interface is in communicative connection with the particular device.

17. The method of claim 16, where the objects represent different commands.

18. The method of claim 16, where the objects represent different data items stored by a memory of the electronic device.

19. The method of claim 18, wherein the same communication action is tied to each object, comprising the steps of:
executing the communication action on the data item to which a touched object relates.

20. The method of claim 16, comprising the step of:
visually indicating that the NFC interface is in communicative connection with the second NFC interface.

21. The method device of claim 16, comprising the step of:
presenting the plurality of separate objects on the display responsive to sensing activation of an input key.

22. The method of claim 16, comprising the step of:
presenting the plurality of separate objects on the display as a default action responsive to the NFC interface establishing a communication connection with the second NFC interface.

23. The method of claim 16, wherein each one of the objects relate to a data item stored in a memory of the electronic device, comprising the step of:
sending the data item corresponding to the touched object to the second electronic device as the predetermined communication action.

24. The method of claim 16, comprising the steps of:
presenting a plurality of command options, where each command option relates to sending of different types of data;
sending data related to the command option by means of the NFC interface, responsive to detecting touching of the related command option.

25. The method of claim 16, wherein the device is a mobile telephone.

26. The method of claim 16, wherein the second device is a mobile telephone.

27. The method of claim 16, where the second device is an NFC tag.

28. The method of claim 16, wherein the NFC interface operates in the 13.56 MHz frequency band.

* * * * *